United States Patent
Subramanian et al.

(10) Patent No.: US 12,202,456 B2
(45) Date of Patent: Jan. 21, 2025

(54) AUTOMATIC VEHICLE BRAKING ARRANGEMENT AND METHOD FOR OPERATING AN AUTOMATIC VEHICLE BRAKING ARRANGEMENT

(71) Applicant: VOLVO TRUCK CORPORATION, Gothenburg (SE)

(72) Inventors: Chidambaram Subramanian, Greensboro, NC (US); Abram McConnell Bradley, IV, Colfax, NC (US)

(73) Assignee: VOLVO TRUCK CORPORATION, Gothenburg (SE)

( * ) Notice: Subject to any disclaimer, the term of this patent is extended or adjusted under 35 U.S.C. 154(b) by 523 days.

(21) Appl. No.: 17/395,937

(22) Filed: Aug. 6, 2021

(65) Prior Publication Data
US 2023/0044528 A1 Feb. 9, 2023

(51) Int. Cl.
*B60T 7/16* (2006.01)
*B60T 17/22* (2006.01)

(52) U.S. Cl.
CPC ............... *B60T 7/16* (2013.01); *B60T 17/22* (2013.01); *B60T 2220/00* (2013.01); *B60T 2230/00* (2013.01)

(58) Field of Classification Search
CPC ..... B60T 7/12; B60T 7/14; B60T 7/16; B60T 17/22; B60T 1617/221
See application file for complete search history.

(56) References Cited

U.S. PATENT DOCUMENTS

| | | | |
|---|---|---|---|
| 9,381,895 B1 | 7/2016 | Smathers | |
| 11,415,979 B2* | 8/2022 | Woodley | G05D 1/0011 |
| 2010/0090522 A1 | 4/2010 | Bensch et al. | |
| 2012/0018240 A1 | 1/2012 | Grubaugh et al. | |
| 2019/0001947 A1 | 1/2019 | Lowe | |
| 2019/0217862 A1 | 7/2019 | Pursifull et al. | |
| 2019/0225197 A1 | 7/2019 | Gomes | |
| 2020/0064825 A1 | 2/2020 | Woodley et al. | |
| 2020/0361428 A1* | 11/2020 | Blumentritt | B60T 17/221 |
| 2023/0026988 A1* | 1/2023 | Subramanian | B60T 8/1708 |

(Continued)

FOREIGN PATENT DOCUMENTS

| | | | | |
|---|---|---|---|---|
| AU | 2014203110 B2 * | 11/2015 | | B60T 13/665 |
| AU | 2016202499 A1 | 12/2016 | | |

(Continued)

OTHER PUBLICATIONS

European Official Action (Jan. 17, 2023) for corresponding European App. 22185461.5.

*Primary Examiner* — Drew J Brown
(74) *Attorney, Agent, or Firm* — WRB-IP PLLC

(57) ABSTRACT

An automatic vehicle braking arrangement includes a vehicle control unit configured to determine whether one or more conditions that must occur to activate an automatic braking function of the vehicle are occurring, to automatically activate the automatic braking function after determining that the one or more conditions are occurring, and to automatically release the automatic braking function after determining that one or more conditions that must occur to release the automatic braking function are occurring. A method for operating such an arrangement is also provided.

28 Claims, 2 Drawing Sheets

(56) References Cited

U.S. PATENT DOCUMENTS

| | | | | |
|---|---|---|---|---|
| 2023/0111488 A1* | 4/2023 | Konishi | ................ | B60W 40/02 |
| | | | | 701/96 |
| 2023/0137063 A1* | 5/2023 | Tsuda | .................... | B60W 10/18 |
| | | | | 701/1 |
| 2023/0219541 A1* | 7/2023 | Yoshizawa | ............... | G08G 1/20 |
| | | | | 701/96 |
| 2023/0294647 A1* | 9/2023 | Wang | ...................... | B60T 8/171 |
| | | | | 701/70 |
| 2023/0347854 A1* | 11/2023 | Subramanian | ........ | B60T 13/662 |

FOREIGN PATENT DOCUMENTS

| | | | | | |
|---|---|---|---|---|---|
| CN | 112193207 A | * | 1/2021 | ........... | B60R 21/013 |
| CN | 116080642 A | * | 5/2023 | | |
| DE | 102012217704 A1 | * | 6/2014 | .............. | B60T 1/005 |
| DE | 102015011498 A1 | * | 3/2016 | ............ | B60W 50/00 |
| KR | 20230078864 A | * | 6/2023 | | |

\* cited by examiner

AUTOMATIC VEHICLE BRAKING ARRANGEMENT AND METHOD FOR OPERATING AN AUTOMATIC VEHICLE BRAKING ARRANGEMENT

BACKGROUND AND SUMMARY

The present invention relates to an automatic vehicle braking arrangement and method that can automatically activate and thereafter release an automatic braking function.

In various vehicle applications, such as refuse and delivery trucks, it is necessary for operators to periodically stop the vehicle and exit the vehicle or the operator's normal operating position to perform tasks, and thereafter return to the operating position and resume driving. It has been known to happen that an operator will leave the vehicle operating position and unintentionally fail to apply or do not properly apply a work brake or parking brake. In this condition, the vehicle can roll away with no operator at the controls which can be hazardous.

For certain vehicles, such as refuse and delivery trucks, when the vehicle operates below a particular speed and/or when the brake pedal is depressed a particular amount or for a particular length of time, it is the operator's intention to stop the vehicle. Even with such an intention the operator may for some reason fail to bring the vehicle to a stop and not realize that the vehicle is continuing to move. This presents a hazardous condition, even though the operator may be in an operator position.

It is desirable to provide an arrangement and method to prevent a vehicle from being able to continue to move or to at least slow down the vehicle when certain conditions are occurring, such as when an operator is not in a vehicle operating position or when a vehicle is operated under conditions suggesting an operator's intention to stop. It is also desirable to provide such an arrangement and method that can automatically stop preventing the vehicle from being able to continue to move or slowing down the vehicle.

According to an aspect of the present invention, an automatic vehicle braking arrangement comprises means for determining whether one or more conditions that must occur to activate an automatic braking function of the vehicle are occurring, means for automatically activating the automatic braking function when the determining means determines that the one or more conditions are occurring, and means for automatically releasing the automatic braking function when the determining means determines that one or more conditions that must occur to release the automatic braking function are occurring.

According to another aspect of the present invention, a method is provided for operating an automatic vehicle braking arrangement, the method comprising determining whether one or more conditions that must occur to activate an automatic braking function of the vehicle are occurring, automatically activating the automatic braking function when it is determined that the one or more conditions are occurring, and automatically releasing the automatic braking function when it is determined that one or more conditions that must occur to release the automatic braking function are occurring.

According to aspects of the invention, the arrangement and method can facilitate stopping or slowing a vehicle in circumstances when an operator is not in a normal operating position and has failed to apply or has not properly applied the vehicle brakes to stop or slow the vehicle.

According to aspects of the invention, the arrangement and method can facilitate stopping or slowing a vehicle in circumstances when the vehicle is operated under conditions suggesting that it is the operator's intention to stop but, for whatever reason, the vehicle continues to move, such as when an operator fails to fully depress a work brake while stopping or stopped.

According to aspects of the invention, the arrangement and method can facilitate releasing a brake after automatically stopping or slowing a vehicle when circumstances that caused the brake to be automatically applied to automatically stop or slow the vehicle cease to occur.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1:
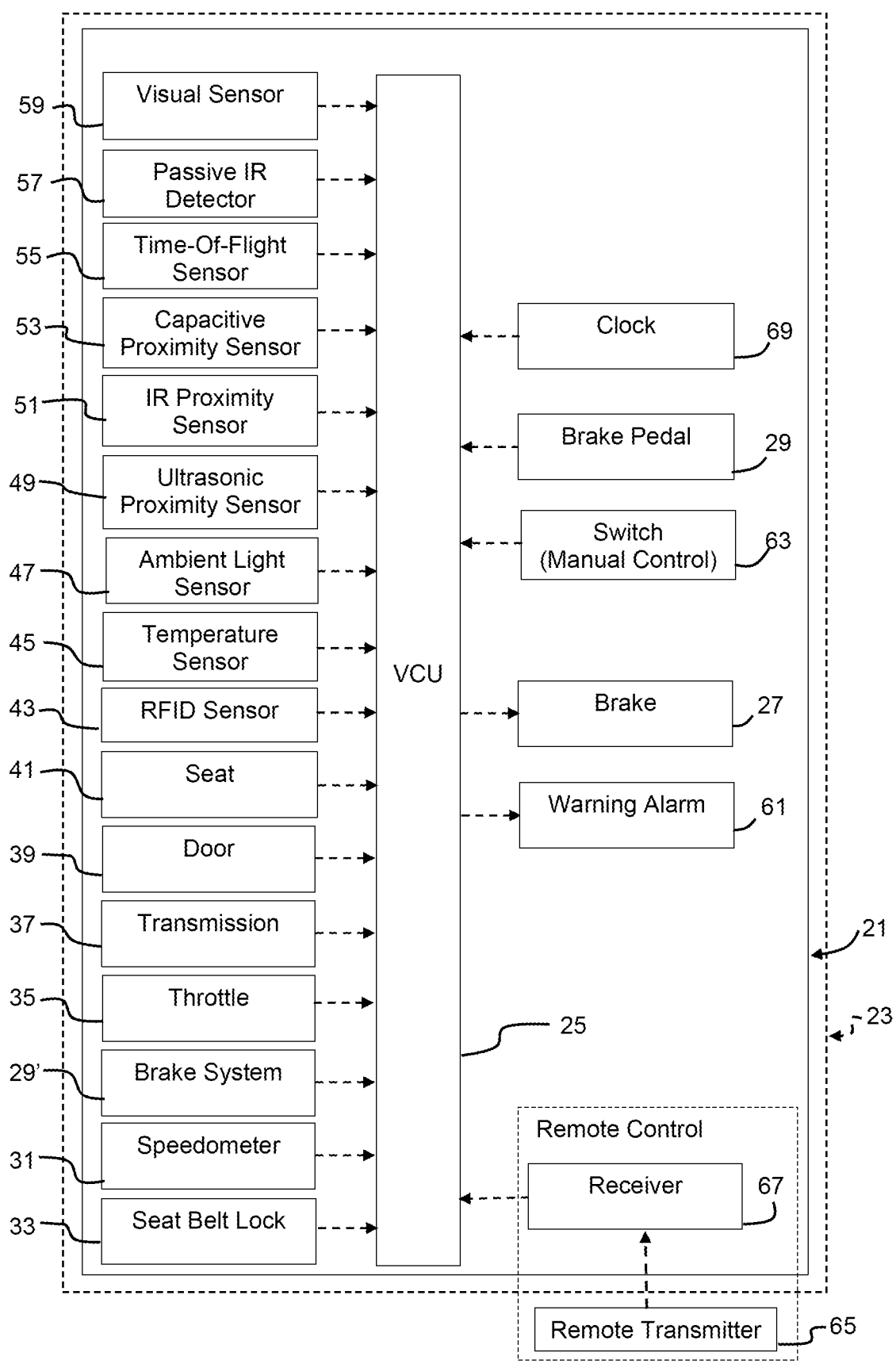
FIG. 1 is a schematic view of an automatic vehicle braking arrangement in a vehicle according to an aspect of the present invention.

An automatic vehicle braking arrangement 21 according to an aspect of the present invention is shown schematically in FIG. 1 as part of a vehicle 23, also shown schematically in phantom. The automatic vehicle braking arrangement 21 includes means for determining whether one or more conditions that must occur to activate an automatic braking function of the vehicle 23 are occurring, means for automatically activating the automatic braking function when the determining means determines that the one or more conditions are occurring, and means for automatically releasing the automatic braking function when the determining means determines that one or more conditions that must occur to release the automatic braking function are occurring. The one or more conditions that must occur to release the automatic braking function may be the cessation of the one or more conditions that must occur to activate the automatic braking function, may be different conditions, or may be a combination of the cessation of the one or more conditions that must occur to activate the automatic braking function and different conditions.

The determining means, the automatic activating means, and the automatic releasing means typically include a device such as a vehicle control unit (VCU) 25 together with a device for sending a signal regarding the one or more conditions for activation or releasing of the automatic braking function to the VCU. The automatic braking function is ordinarily activated—meaning that a brake 27, typically but not necessarily a work brake, is applied—via a signal from the VCU to apply the brake to at least slow down and, more typically, stop the vehicle 23. By contrast, the automatic vehicle braking arrangement 21 can be activated so that the determining means, the automatic activating means, and the automatic releasing means are in an activated state and adapted to perform their functions, and deactivated so that at least the automatic activating means and the automatic releasing means (and, if desired, the determining means) are in a deactivated state and do not perform their functions.

Ordinarily, one of the one or more conditions includes a manual or remote selection for activation of the automatic braking function (and one of the one or more conditions for releasing of the automatic braking function may include a manual or remote selection for releasing). For example, an operator operated switch 63 may send a signal to the VCU for manual activation or releasing of the automatic braking function, and the automatic braking function may be remotely activated or released such as via a remote transmitter 65 and a receiver 67 for receiving signals from the remote transmitter and providing them to the VCU. The one or more conditions for activation of the automatic braking function may include, in addition to or instead of at least a manual or remote selection for activation of the automatic braking function, one or more conditions such as depression of a brake pedal 29 more than a predetermined amount, such as 10%, and vehicle speed, such as measured by a speedometer 31, below a predetermined speed. The one or more conditions for releasing the automatic braking function may include, in addition to or instead of at least a manual or remote selection for releasing of the automatic braking function, one or more conditions such as depression of a throttle 35 more than a predetermined amount, such as 10%.

One of the one or more conditions for activation of the automatic braking function can include a determination that a vehicle operator is not in a vehicle operating position (and one of the one or more conditions for releasing the automatic braking function can include a determination that a vehicle operator is in a vehicle operating position). For example, the VCU 25 can determine that the operator is not in the vehicle operating position based on a signal from one or more of a seat belt lock 33 (e.g., locked or unlocked), a vehicle speedometer 31 (e.g., whether vehicle is rolling at a slow speed suggesting operator may have exited vehicle to perform a task), a vehicle brake system 29' (which may include, e.g., whether the brake pedal 29 is depressed), a vehicle throttle 35 (e.g., whether accelerator pedal depressed), a vehicle transmission 37 (e.g., whether the vehicle is in gear), a vehicle door 39 (e.g., open or closed), a vehicle seat 41 (e.g., whether a sensor detects the weight of an operator), a radio frequency identification (RFID) sensor 43 (e.g., whether an RFID chip worn by an operator is in range of the RFID sensor), a temperature sensor 45 (e.g., whether an operator temperature is detected where it is supposed to be), an ambient light sensor 47 (e.g., whether an operator's body blocks ambient light to the sensor), an ultrasonic proximity sensor 49 (e.g., whether a sound wave is reflected by an object where the operator should be), an infrared (IR) proximity sensor 51 (e.g., whether a beam of IR light is reflected by an object where the operator should be), a capacitive proximity sensor 53 (e.g., whether there is a change in an electrical field where the operator should be), a time-of-flight sensor 55 (e.g., whether a beam of light is reflected in the time that it should be if an operator were where he or she should be), a passive IR detector 57 (e.g., whether IR light radiating from an operator is detected), and a visual sensor 59 (e.g., whether an image of an operator-shaped object is detected where the operator should be). The foregoing should be understood to be a non-exclusive list of devices that can send a signal suggesting the presence or absence of an operator in a vehicle operator position.

The means for automatically activating the automatic braking function, e.g VCU 25, may, in addition to, simultaneously with or before actuating a braking function, provide an operator warning, such as activating an alarm 61, when the determining means, e.g., VCU 25, determines that the one or more conditions for activation of the automatic braking function are occurring. Similarly, the means for automatically releasing the automatic braking function may, in addition to, simultaneously with or before releasing the automatic braking function, stop the operator warning when the determining means, e.g., VCU 25, determines that the one or more conditions for releasing the automatic braking function are occurring.

When the VCU 25 receives a signal from, e.g., one or more of the devices 29-59 and/or 63-67, that the one or more conditions that must occur for activating the automatic braking function are occurring, the VCU can activate the automatic braking function and apply the brake 27 to slow down and/or stop the vehicle 23. Similarly, when the VCU 25 receives a signal from, e.g., one or more of the devices 29-59 and/or 63-67 that the one or more conditions that must occur to release the automatic braking function are occurring, the VCU can release the automatic braking function so that the brake 27 will be released.

The automatic vehicle braking arrangement 21 may further include means for manually deactivating the automatic vehicle braking arrangement (as opposed to merely releasing the automatic braking function), such as via an operator operated switch 63 for sending a signal to the VCU, remotely deactivating the automatic vehicle braking arrangement, such as via a remote transmitter 65 and a receiver 67 for receiving signals from the remote transmitter and providing them to the VCU, or automatically deactivating the automatic vehicle braking arrangement, such as upon receipt of signals by the VCU from one or more of the devices 29-59 and/or 63-67 suggesting the desirability of deactivation of the automatic vehicle braking arrangement.

The automatic vehicle braking arrangement 21 may also include means for manually or remotely enabling activation of the automatic vehicle braking arrangement after manually, remotely, or automatically deactivating the automatic vehicle braking arrangement, which may be the same switch 63 for manual operation, and the same transmitter 65 and receiver 67 for remote operation. The means for manually or remotely enabling activation of the automatic vehicle braking arrangement 21 may be useful to ensure that the automatic vehicle braking arrangement will only automatically activate the automatic braking function and brake the vehicle, such as by applying the brake 27, when it is positively desired to do so by an on-site or remote operator, or in circumstances when it might be desirable to override a previous manual, remote, or automatic deactivation of the automatic vehicle braking arrangement.

It will be appreciated that the automatic vehicle braking arrangement 21 may activate the automatic braking function in response to a manual or remote signal, as contrasted with enabling the automatic vehicle braking arrangement without necessarily activating the automatic braking function. For example, the switch 63 or transmitter 65 and receiver 67 arrangement can provide a manual or remote signal that functions as the condition, or one of the one or more conditions, that must occur to activate the automatic braking function of the vehicle 23.

The means for automatically deactivating the automatic vehicle braking arrangement 21 will ordinarily be configured to automatically deactivate the automatic vehicle braking arrangement under one or more vehicle operating conditions, which vehicle operating conditions may include when the VCU 25 receives one or more signals from one or more of the devices 29-59 and/or 63-67. Vehicle operating conditions that can result in automatic deactivation of the automatic vehicle braking arrangement 21 may include, for example, conditions that must occur for releasing the automatic braking function, as well as other conditions reflecting the vehicle's operation. For example, the means for automatically deactivating may deactivate the automatic vehicle braking arrangement 21 when vehicle operating conditions include operation above a predetermined speed, such as a speed that would tend to occur only when the vehicle 23 is being driven on a highway. Further, the means for automatically deactivating may deactivate the automatic vehicle braking arrangement 21 when vehicle operating conditions include operation above the predetermined speed for more than a predetermined period of time as measured by a clock 69, which might tend more certainly to involve driving under circumstances, such as highway driving, where the automatic vehicle braking arrangement would not tend to be expected to be useful or may be undesirable. Without wishing to limit the vehicle operating conditions that might be useful to trigger deactivation of the automatic vehicle braking arrangement, 21 other vehicle operating conditions that might trigger deactivation of the automatic vehicle braking arrangement of include depression of a throttle pedal 35 more than a predetermined amount, depression of a brake pedal 29 followed by depression of a throttle pedal 35, or performing some other particular sequence of actions that result in signals being sent to the VCU 25 that are interpreted by the VCU as suggesting desirability of deactivating the automatic vehicle braking arrangement.

Figure 2:
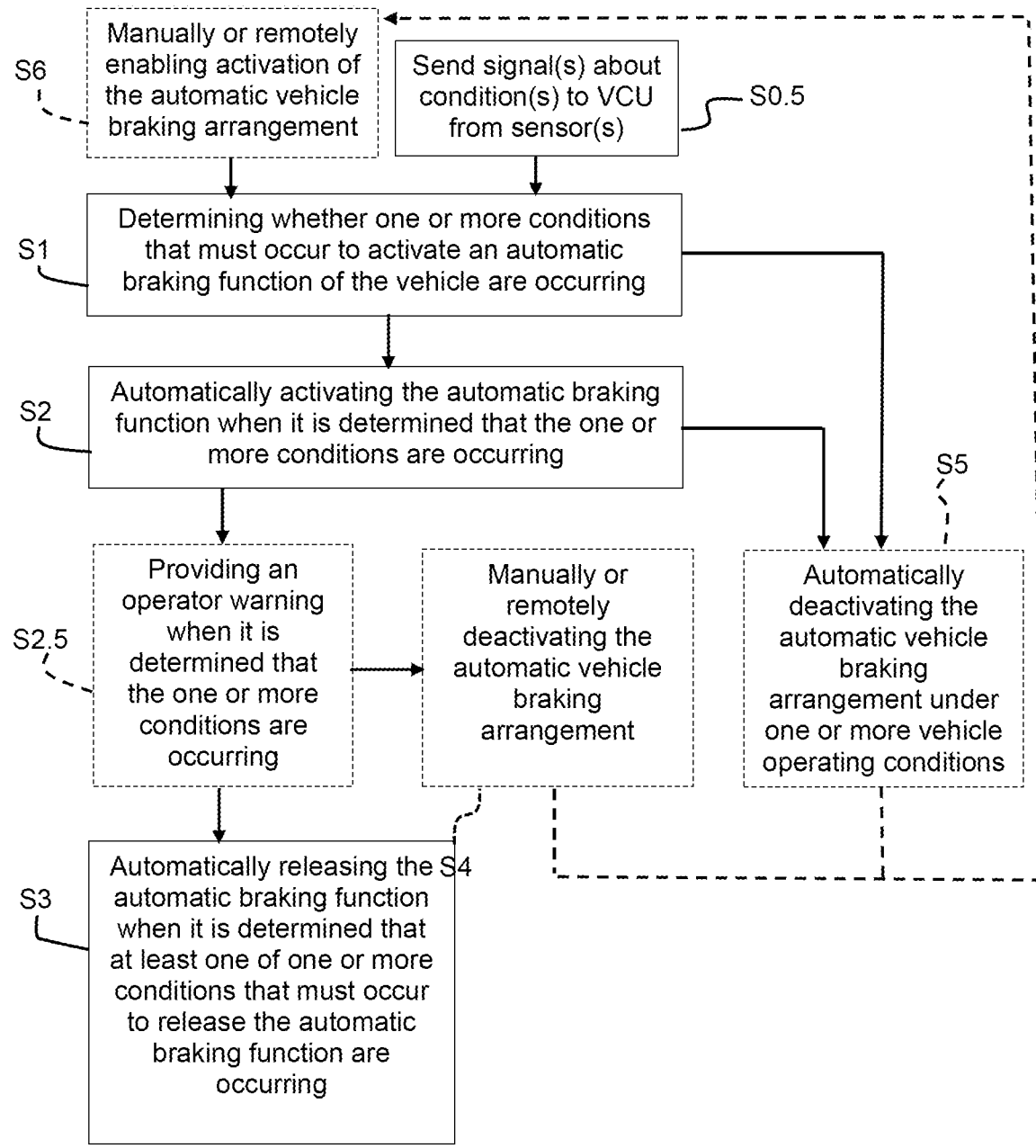
FIG. 2 is a flow chart showing steps in a method for operating an automatic vehicle braking arrangement according to another aspect of the invention.

A method for operating an automatic vehicle braking arrangement 21 according to another aspect of the invention is shown in FIG. 2. At a basic level, the method includes a step S1 of determining, such as with the VCU 25, whether one or more conditions that must occur to activate an automatic braking function of the vehicle 23 are occurring, such as upon receipt of signals by the VCU sent at step S0.5 from one or more of the devices 29-59 and/or 63-67, a step S2 of automatically activating the automatic braking function, such as with the VCU, when it is determined that the one or more conditions are occurring, and a step S3 of automatically releasing the automatic braking function, such as with the VCU, when it is determined that at least one of the one or more conditions has ceased to occur, such as upon receipt by the VCU of signals from one or more of the devices 29-59 and/or 63-67. The method can also include an optional step S2.5 of providing an operator warning, such as via an alarm 61, when it is determined that the one or more conditions are occurring.

The method can also comprise a step S4 of manually deactivating the automatic vehicle braking arrangement 21 (as opposed to merely releasing the automatic braking function), such as via an operator operated switch 63 for sending a signal to the VCU, or remotely deactivating the automatic vehicle braking arrangement, such as via a remote transmitter 65 and a receiver 67 for receiving signals from the remote transmitter and providing them to the VCU, or a step S5 of automatically deactivating the automatic vehicle braking arrangement, such as upon receipt of signals by the VCU from one or more of the devices 29-59 and/or 63-67 suggesting the desirability of deactivation of the automatic vehicle braking arrangement. The method may also include a step S6 of manually or remotely enabling activation of the automatic vehicle braking arrangement after manually, remotely, or automatically deactivating the automatic vehicle braking arrangement, where the manual activation enablement may be via the same switch 63 for manual operation, and the remote activation enablement may be via the same transmitter 65 and receiver 67 for remote operation.

Several illustrative examples of how the automatic vehicle braking arrangement 21 and method might be applied include:

(a) An operator of a refuse vehicle 23 may turn the operator operated switch 63 to a position that that sends a signal to the VCU 25 that enables activation of the automatic vehicle braking arrangement 21 and method. Signals are sent to the VCU 25 when the operator depresses the brake pedal 29 more than, say, 10% and the speedometer 31 registers that the vehicle's 23 speed falls below 3 miles per hour. Upon receipt of these input signals the VCU 25 will send a trigger signal to a brake electronic control unit (ECU) activate the automatic braking function and apply the work brake 27. In this circumstance the pressure on the brakes 27 will be held even if the operator removes his foot from the brake pedal 29, such as when the operator goes out to collect refuse. Because the signal for activating the automatic braking function and applying the work brakes 27, the work brakes will not be released until one or more necessary release trigger signals are received by the VCU 25 to release the automatic braking function and release the work brakes 27. The release trigger signal to the VCU 25 in this example may result from the operator's application of pressure to the throttle 35 more than 10%.

(b) In the example in (a), instead of enabling activating the automatic vehicle braking arrangement 21 via the operator operated switch 63, the automatic vehicle braking arrangement may already (or always) be activated and the operator's operation of the switch 63 may be one of the conditions that must occur to activate the automatic braking function of the vehicle 23, together with a signal reflecting depression of the brake pedal 29 more than a predetermined amount and the speedometer 31 sending a signal that the vehicle speed is 3 miles per hour or less.

(c) An operator of a refuse vehicle 23 may stop the vehicle and exit the operator position without realizing that the vehicle is still moving or capable of moving. A signal is sent to the VCU 25 from one or more devices 29-59 that can send a signal suggesting the presence or absence of the operator in the vehicle operator position. In response to the signal that the operator is not in an operator position, the VCU 25 then activates the automatic braking function and latch the brake 27 so that it is applied and stops (or, if desired, slows) the vehicle. When the operator returns to the operator position, a signal is sent to VCU 25 from one or more devices 29-59 that releases the automatic braking function and delatches the brake 27 so that it is released and is controlled by the operator.

(d) In the example in (c), before the VCU 25 releases the automatic braking function, in addition to receiving a signal that the operator is in the operator position, the VCU must receive a signal such as application of the throttle 35 more than a predetermined amount, or application of the brake followed by application of the throttle.

(e) An operator of a refuse vehicle 23 may turn the operator operated switch 63 to a position that that sends a signal to the VCU 25 that enables activation of the automatic vehicle braking arrangement 21 and method. The vehicle 23 is then driven onto a highway and the VCU 25 receives a signal from the speedometer 31 that the vehicle is being operated above a predetermined speed and a signal from the clock 69 that the vehicle has been operated above the predetermined speed for longer than a predetermined period of time. In response to receipt of the signals from the speedometer 31 and the clock 69, the VCU 25 automatically deactivates the automatic vehicle braking arrangement 21.

(f) In the example in (e), after the VCU 25 has automatically deactivated the automatic vehicle braking arrangement 21, the VCU 25 receives a signal from the speedometer 31 that the vehicle is being operated below a second predetermined speed (which may be the same as the predetermined speed or different, such as less) and a signal from the clock 69 that the vehicle has been operated below the second predetermined speed for longer than a second predetermined period of time (which may be the same as the predetermined period of time or different). In response to receipt of the signals from the speedometer 31 and the clock 69, the VCU 25 automatically enables activation of the automatic vehicle braking arrangement 21. Alternatively, the VCU 25 may automatically activate the automatic vehicle braking arrangement 21.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. An automatic vehicle braking arrangement, comprising:
    means for determining whether one or more conditions that must occur to activate an automatic braking function of working brakes of the vehicle are occurring, for determining that the one or more conditions that must occur to activate the automatic braking function have ceased to occur, and for determining whether one or more conditions that must occur to release the automatic braking function are occurring;
    means for automatically activating the automatic braking function when the determining means determines that the one or more conditions for automatically activating are occurring; and
    means for automatically releasing the automatic braking function when the determining means determines that the one or more conditions that must occur to release the automatic braking function are occurring and also determines that the one or more conditions that must occur to activate the automatic braking function have ceased to occur.

2. The automatic vehicle braking arrangement as set forth in claim 1, wherein the means for automatically activating the automatic braking function provides an operator warning when the determining means determines that the one or more conditions that must occur to activate the automatic braking function are occurring.

3. The automatic vehicle braking arrangement as set forth in claim 1, wherein one of the one or more conditions that must occur to activate the automatic braking function includes a manual or remote selection for activation of the automatic braking function.

4. The automatic vehicle braking arrangement as set forth in claim 1, wherein the one or more conditions that must occur to activate the automatic braking function includes at least a manual or remote selection for activation of the automatic braking function, depression of a brake pedal more than a predetermined amount, and vehicle speed below a predetermined speed.

5. The automatic vehicle braking arrangement as set forth in claim 1, wherein one of the one or more conditions that must occur to activate the automatic braking function includes a determination that a vehicle operator is not in a vehicle operating position.

6. The automatic vehicle braking arrangement set forth in claim 5, wherein the determining means determines that the operator is not in the vehicle operating position based on a signal from one or more of a seat belt lock, a vehicle speedometer, a vehicle brake system, a vehicle throttle, a vehicle transmission, a vehicle door, a vehicle seat, an RFID sensor, a temperature sensor, an ambient light sensor, an ultrasonic proximity sensor, an IR proximity sensor, a capacitive proximity sensor, a time-of-flight sensor, a passive IR detector, and a visual sensor.

7. The automatic vehicle braking arrangement as set forth in claim 1, comprising means for manually, remotely, or automatically deactivating the automatic vehicle braking arrangement.

8. The automatic vehicle braking arrangement as set forth in claim 7, comprising means for manually or remotely enabling activation of the automatic vehicle braking arrangement after manually, remotely, or automatically deactivating the automatic vehicle braking arrangement.

9. The automatic vehicle braking arrangement as set forth in claim 1, wherein the one or more conditions that must occur to release the automatic braking function comprises one or more vehicle operating conditions, the automatic vehicle braking arrangement further comprising means for automatically deactivating the automatic vehicle braking arrangement when the determining means determines that at least one of the one or more one or more vehicle operating conditions is occurring.

10. The automatic vehicle braking arrangement as set forth in claim 9, wherein the one or more vehicle operating conditions includes operation above a predetermined speed, and the means for automatically deactivating deactivates the automatic vehicle braking arrangement when the determining means determines that operation above the predetermined speed is occurring.

11. The automatic vehicle braking arrangement as set forth in claim 9, wherein the one or more vehicle operating conditions includes operation above a predetermined speed for more than a predetermined period of time, and the means for automatically deactivating deactivates the automatic vehicle braking arrangement when the determining means determines that operation above the predetermined speed for more than the predetermined period of time is occurring.

12. The automatic vehicle braking arrangement as set forth in claim 9, wherein the one or more vehicle operating conditions includes depression of a throttle pedal more than a predetermined amount, and the means for automatically deactivating deactivates the automatic vehicle braking arrangement when the determining means determines that depression of the throttle pedal more than the predetermined amount is occurring.

13. The automatic vehicle braking arrangement as set forth in claim 9, wherein the one or more vehicle operating conditions includes depression of a brake pedal followed by depression of a throttle pedal, and the means for automatically deactivating deactivates the automatic vehicle braking arrangement when the determining means determines that depression of the brake pedal followed by depression of the throttle pedal is occurring.

14. A method for operating an automatic vehicle braking arrangement, comprising:
    determining whether one or more conditions that must occur to activate an automatic braking function of working brakes of the vehicle are occurring;

automatically activating the automatic braking function when it is determined that the one or more conditions that must occur to activate the automatic braking function are occurring;

determining whether one or more conditions that must occur to release the automatic braking function are occurring;

determining that the one or more conditions that must occur to activate the automatic braking function have ceased to occur; and automatically releasing the automatic braking function when it is determined that the one or more conditions that must occur to release the automatic braking function are occurring and when it is also determined that the one or more conditions that must occur to activate the automatic braking function have ceased to occur.

15. The method for operating an automatic vehicle braking arrangement as set forth in claim 14, comprising providing an operator warning when it is determined that the one or more conditions that must occur to activate the automatic braking function automatic braking function are occurring.

16. The method for operating an automatic vehicle braking arrangement as set forth in claim 14, wherein one of the one or more conditions that must occur to activate the automatic braking function automatic braking function includes a manual or remote selection for activation of the automatic braking function.

17. The method for operating an automatic vehicle braking arrangement as set forth in claim 14, wherein the one or more conditions that must occur to activate the automatic braking function automatic braking function includes at least a manual or remote selection for activation of the automatic braking function, depression of a brake pedal more than a predetermined amount, and vehicle speed below a predetermined speed.

18. The method for operating an automatic vehicle braking arrangement as set forth in claim 14, wherein one of the one or more conditions that must occur to activate the automatic braking function automatic braking function includes a determination that a vehicle operator is not in a vehicle operating position.

19. The method for operating an automatic vehicle braking arrangement as set forth in claim 18, comprising basing the determination that the operator is not in the vehicle operating position on a signal from one or more of a seat belt lock, a vehicle speedometer, a vehicle brake system, a vehicle throttle, a vehicle transmission, a vehicle door, a vehicle seat, an RFID sensor, a temperature sensor, an ambient light sensor, an ultrasonic proximity sensor, an IR proximity sensor, a capacitive proximity sensor, a time-of-flight sensor, a passive IR detector, and a visual sensor.

20. The method for operating an automatic vehicle braking arrangement as set forth in claim 14, comprising manually, remotely, or automatically deactivating the automatic vehicle braking arrangement.

21. The method for operating an automatic vehicle braking arrangement as set forth in claim 20, comprising manually or remotely enabling activation of the automatic vehicle braking arrangement after manually, remotely, or automatically deactivating the automatic vehicle braking arrangement.

22. The method for operating an automatic vehicle braking arrangement as set forth in claim 14, wherein the one or more conditions that must occur to release the automatic braking function comprises one or more vehicle operating conditions, the method comprising determining whether at least one of the one or more vehicle operating is occurring, and automatically deactivating the automatic vehicle braking arrangement when it is determined that at least one of the one or more vehicle operating conditions is occurring.

23. The method for operating an automatic vehicle braking arrangement as set forth in claim 22, the one or more vehicle operating conditions includes operation above a predetermined speed, the method comprising determining that operation above the predetermined speed is occurring, and automatically deactivating the automatic vehicle braking arrangement when it is determined that operation above a predetermined speed is occurring.

24. The method for operating an automatic vehicle braking arrangement as set forth in claim 22, the one or more vehicle operating conditions includes operation above a predetermined speed for more than a predetermined period of time, the method comprising determining whether operation above the predetermined speed for more than the predetermined time is occurring, and automatically deactivating the automatic vehicle braking arrangement when it is determined that operation above the predetermined speed for more than the predetermined period of time is occurring.

25. The method for operating an automatic vehicle braking arrangement as set forth in claim 22, wherein the one or more vehicle operating conditions includes depression of a throttle pedal more than a predetermined amount, the method comprising determining whether depression of the throttle pedal more than the predetermined amount is occurring, and automatically deactivating the automatic vehicle braking arrangement when it is determined that depression of the throttle pedal more than the predetermined amount is occurring.

26. The method for operating an automatic vehicle braking arrangement as set forth in claim 22, wherein the one or more vehicle operating conditions includes depression of a brake pedal followed by depression of a throttle pedal, the method comprising determining whether depression of the brake pedal followed by depression of the throttle pedal more than the predetermined amount is occurring, and automatically deactivating the automatic vehicle braking arrangement when it is determined that depression of the brake pedal followed by depression of the throttle pedal more than the predetermined amount is occurring.

27. An automatic vehicle braking arrangement, comprising:

means for determining whether one or more conditions that must occur to activate an automatic braking function of the vehicle are occurring, for determining that the one or more conditions that must occur to activate the automatic braking function have ceased to occur, and for determining whether one or more conditions that must occur to release the automatic braking function are occurring;

means for automatically activating the automatic braking function when the determining means determines that the one or more conditions for automatically activating are occurring; and means for automatically releasing the automatic braking function when the determining means determines that the one or more conditions that must occur to release the automatic braking function are occurring and also determines that the one or more conditions that must occur to activate the automatic braking function have ceased to occur, wherein occurrence of at least one of the one or more conditions that must occur to release the automatic braking function involves sensing a status of at least one condition other than any condition of the one or more conditions that must occur to activate the automatic braking function.

28. A method for operating an automatic vehicle braking arrangement, comprising:
   determining whether one or more conditions that must occur to activate an automatic braking function of the vehicle are occurring;
   automatically activating the automatic braking function when it is determined that the one or more conditions that must occur to activate the automatic braking function are occurring;
   determining whether one or more conditions that must occur to release the automatic braking function are occurring;
   determining that the one or more conditions that must occur to activate the automatic braking function have ceased to occur; and
   automatically releasing the automatic braking function when it is determined that the one or more conditions that must occur to release the automatic braking function are occurring and when it is also determined that the one or more conditions that must occur to activate the automatic braking function have ceased to occur,
   wherein occurrence of at least one of the one or more conditions that must occur to release the automatic braking function involves sensing a status of at least one condition other than any condition of the one or more conditions that must occur to activate the automatic braking function.

* * * * *